US012015199B2

(12) United States Patent
Lin et al.

(10) Patent No.: US 12,015,199 B2
(45) Date of Patent: Jun. 18, 2024

(54) ANTENNA STRUCTURE

(71) Applicant: Cheng Uei Precision Industry Co., LTD., New Taipei (TW)

(72) Inventors: Ming-Ju Lin, New Taipei (TW); Chih-Chung Wang, New Taipei (TW); Shao-Kai Sun, New Taipei (TW); Lan-Yung Hsiao, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 121 days.

(21) Appl. No.: 17/967,891

(22) Filed: Oct. 18, 2022

(65) Prior Publication Data

US 2023/0216183 A1 Jul. 6, 2023

(30) Foreign Application Priority Data

Jan. 6, 2022 (CN) ........................ 202220022704.9

(51) Int. Cl.
*H01Q 1/38* (2006.01)
*H01Q 1/48* (2006.01)
*H01Q 1/50* (2006.01)

(52) U.S. Cl.
CPC ................ *H01Q 1/38* (2013.01); *H01Q 1/48* (2013.01); *H01Q 1/50* (2013.01)

(58) Field of Classification Search
CPC .. H01Q 1/38; H01Q 1/48; H01Q 1/50; H01Q 5/371
See application file for complete search history.

(56) References Cited

U.S. PATENT DOCUMENTS

2010/0177005 A1* 7/2010 Hsiao .................... H01Q 5/371 343/700 MS

* cited by examiner

*Primary Examiner* — Daniel D Chang
(74) *Attorney, Agent, or Firm* — Cheng-Ju Chiang

(57) ABSTRACT

An antenna structure includes a substrate, a radiator mounted at one end of a front surface of the substrate, and a grounding element mounted at the other end of the front surface of the substrate. The radiator has a first radiating portion. Two portions of a middle of one end edge of the first radiating portion extend horizontally to form a second radiating portion and a feeding portion. The feeding portion is located above the second radiating portion. A free end of the feeding portion is a feeding end. An upper portion of the other end edge of the first radiating portion extends opposite to the one end edge of the first radiating portion and extends along a rectangular spiral path to form a rectangular spiral third radiating portion.

16 Claims, 7 Drawing Sheets

| Frequency Band | Frequency (MHz) | Efficiency (%) |
|---|---|---|
| 700 | 704-824 | 76.58 |
| 800 | 791-894 | 63.18 |
| 900 | 880-960 | 59.94 |
| 1800 | 1710-1890 | 67.09 |
| 1900 | 1845-1995 | 72.38 |
| 2100 | 1920-2170 | 56.19 |
| 2300 | 2300-2360 | 42.03 |
| 2600 | 2500-2690 | 54.43 |
| 3500 | 3300-3800 | 60.7 |
| 4500 | 4400-5000 | 52.95 |

FIG. 7

ANTENNA STRUCTURE

CROSS-REFERENCE TO RELATED APPLICATION

The present application is based on, and claims priority from, China Patent Application No. 202220022704.9, filed Jan. 6, 2022, the disclosure of which is hereby incorporated by reference herein in its entirety.

BACKGROUND OF THE INVENTION

1. Field of the Invention

The present invention generally relates to an antenna structure, and more particularly to an antenna structure with multiple frequency bands.

2. The Related Art

In response to a development of 5G (Fifth Generation) mobile communication technology, in the SUB-6G frequency band, the n77 frequency band, the n78 frequency band and the n79 frequency band need to be added to an existing 4G frequency band. Under current multiple frequency band demands for mobile communications, how to provide multiple frequency bands in a limited space of an antenna structure has become a challenge.

In order to satisfy a demand for using 4G and 5G sharing devices with external antennas on the market, used antennas will have customized frequency band designs due to different signal support frequency bands of countries where the sharing devices are sold. Or the sharing devices use MIMO (Multiple Input Multiple Output) functions to make that the antennas with different frequency bands are covered to one another to increase a transmission efficiency of each antenna. Therefore, a single antenna that is able to cover a full frequency band will be more important under benefits of the multiple antennas.

Thus, it is necessary to provide an antenna structure with multiple frequency bands, the antenna structure is capable of having a multiple frequency band function in a limited space.

SUMMARY OF THE INVENTION

An object of the present invention is to provide an antenna structure with multiple frequency bands. The antenna structure includes a substrate, a radiator mounted at one end of a front surface of the substrate, and a grounding element mounted at the other end of the front surface of the substrate. The radiator has a first radiating portion. Two portions of a middle of one end edge of the first radiating portion extend horizontally to form a second radiating portion and a feeding portion. The feeding portion is located above the second radiating portion. A free end of the feeding portion is a feeding end. An upper portion of the other end edge of the first radiating portion extends opposite to the one end edge of the first radiating portion and extends along a rectangular spiral path to form a rectangular spiral third radiating portion. The grounding element has a first grounding portion, a second grounding portion and a connecting portion. The connecting portion has a connecting edge facing towards the one end edge of the first radiating portion and extends along a vertical direction. The connecting edge is spaced from the one end edge of the first radiating portion. An upper portion and a lower portion of the connecting edge extend horizontally and towards the one end edge of the first radiating portion to form the first grounding portion and the second grounding portion. The first grounding portion is located above the feeding portion, and the second grounding portion is located below the feeding portion.

Another object of the present invention is to provide an antenna structure. The antenna structure includes a substrate, a radiator mounted at one end of a front surface of the substrate, and a grounding element. The radiator has a first radiating portion. Two portions of a middle of one end edge of the first radiating portion extend horizontally to form a second radiating portion, and a feeding portion approaching the second radiating portion. A free end of the feeding portion is a feeding end. The other end edge of the first radiating portion extends horizontally and opposite to the one end edge of the first radiating portion, then extends downward, next extends towards the other end edge of the first radiating portion, later extends upward and finally extends horizontally and opposite to the one end edge of the first radiating portion to form a rectangular spiral third radiating portion. The grounding element is mounted at the other end of the front surface of the substrate and approaches the radiator. The grounding element has a first grounding portion, a second grounding portion and a connecting portion. The connecting portion has a connecting edge facing towards the one end edge of the first radiating portion. The connecting edge is spaced from the one end edge of the first radiating portion. An upper portion and a lower portion of the connecting edge extend horizontally and towards the one end edge of the first radiating portion to form the first grounding portion and the second grounding portion. The feeding portion is positioned among the first grounding portion, the second grounding portion and the connecting portion. The second radiating portion is positioned among the first radiating portion, the feeding portion and one of the first grounding portion and the second grounding portion. The feeding end of the feeding portion approaches the middle of the connecting edge of the connecting portion. The feeding end of the feeding portion is spaced from the middle of the connecting edge of the connecting portion, the first grounding portion and the second grounding portion of the grounding element.

Another object of the present invention is to provide an antenna structure. The antenna structure includes a substrate, a radiator mounted at one end of a front surface of the substrate, and a grounding element mounted at the other end of the front surface of the substrate. The radiator has a first radiating portion, a feeding portion, a second radiating portion, a third radiating portion and a grounding element. The first radiating portion has one end edge, and the other end edge opposite to the one end edge. The feeding portion horizontally extends from a middle of the one end edge of the first radiating portion. A free end of the feeding portion is a feeding end. The second radiating portion horizontally extends from the middle of the one end edge of the first radiating portion. The second radiating portion approaches the feeding portion to cause a coupling effect between the feeding portion and the second radiating portion. The third radiating portion extends along a spiral path and extends from the other end edge of the first radiating portion. The grounding element is mounted at the front surface of the substrate and approaches the radiator. The grounding element surrounds the feeding portion to form a parasitic effect between the grounding element and the feeding portion.

As described above, the antenna structure is a dipole antenna structure, the radiator is operated at frequencies which are ranged from 698 MHz to 960 MHz, frequencies which are ranged from 1710 MHz to 2170 MHz and frequencies which are ranged from 3300 MHz to 3800 MHz. The antenna structure is operated at the frequency bands which are generated by the parasitic effect of the first grounding portion and the second grounding portion of the grounding element, and the feeding portion of the radiator. In that case, the antenna structure is with the multiple frequency bands, the antenna structure is capable of having a multiple frequency band function in a limited space, so application frequency bands of the antenna structure are wider, and an area of the antenna structure is able to be used more effectively to save a space.

BRIEF DESCRIPTION OF THE DRAWINGS

The present invention will be apparent to those skilled in the art by reading the following description, with reference to the attached drawings, in which:

FIG. 7 is a table showing average values of radiation efficiencies corresponding to frequency bands of the antenna structure in accordance with the preferred embodiment of the present invention.

DETAILED DESCRIPTION OF THE PREFERRED EMBODIMENT

Figure 1:
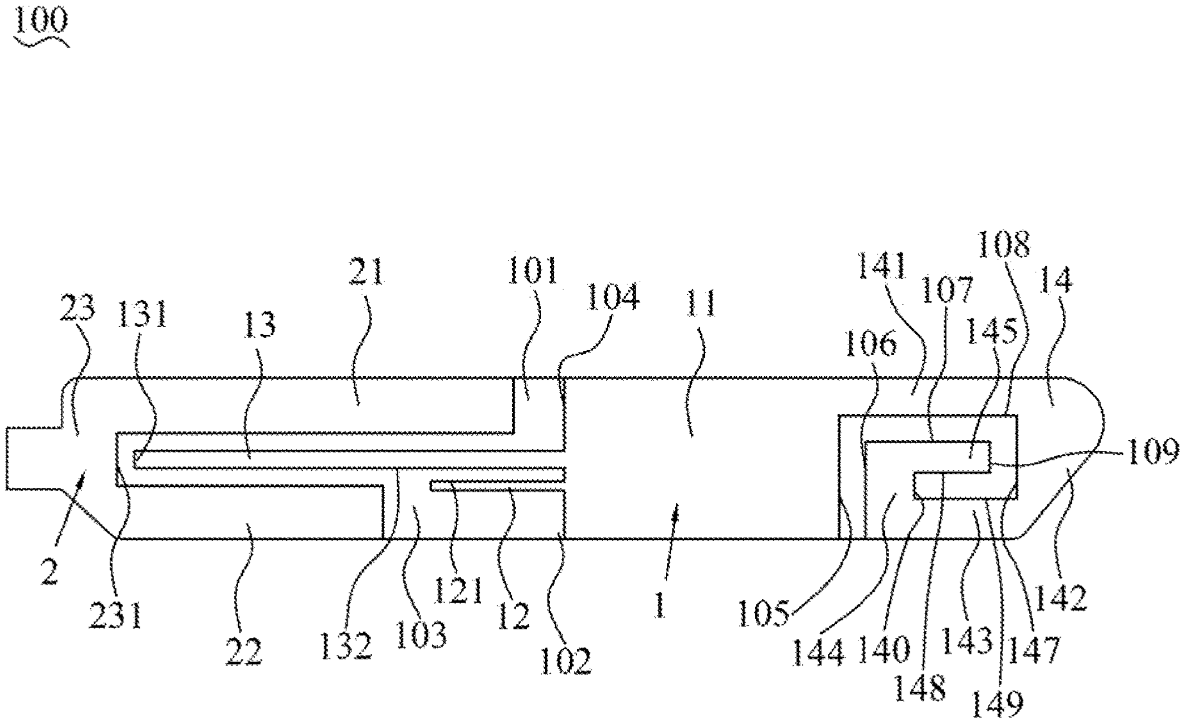
FIG. 1 is a perspective view of an antenna structure in accordance with a preferred embodiment of the present invention.

With reference to FIG. 1, an antenna structure 100 in accordance with a preferred embodiment of the present invention is shown. The antenna structure 100 includes a substrate 101, a radiator 1 and a grounding element 2. The radiator 1 and the grounding element 2 are disposed at a surface 102 of the antenna structure 100. The antenna structure 100 is a dipole antenna structure.

The radiator 1 is located at one end of the surface 102 of the antenna structure 100. The radiator 1 is mounted at one end of a front surface 103 of the substrate 101. The radiator 1 has a first radiating portion 11. The first radiating portion 11 has one end edge 104, and the other end edge 105 opposite to the one end edge 104. The first radiating portion 11 is rectangular. Two portions of a middle of the one end edge 104 of the first radiating portion 11 extend horizontally to form a second radiating portion 12, and a feeding portion 13 approaching the second radiating portion 12. The feeding portion 13 is spaced from the second radiating portion 12. The feeding portion 13 horizontally extends from a middle of the one end edge 104 of the first radiating portion 11. The feeding portion 13 is located above the second radiating portion 12. A free end of the feeding portion 13 is a feeding end 131. The second radiating portion 12 horizontally extends from the middle of the one end edge 104 of the first radiating portion 11. The second radiating portion 12 approaches the feeding portion 13 to cause a coupling effect between the feeding portion 13 and the second radiating portion 12.

The feeding portion 13 is longer than the second radiating portion 12 along a horizontal direction. The second radiating portion 12 and the feeding portion 13 are rectangular. The second radiating portion 12 and the feeding portion 13 are rectangular strips. A first horizontal edge 121 of the second radiating portion 12 faces a second horizontal edge 132 of the feeding portion 13. The first horizontal edge 121 of the second radiating portion 12 approaches the second horizontal edge 132 of the feeding portion 13. The first horizontal edge 121 of the second radiating portion 12 is spaced from the second horizontal edge 132 of the feeding portion 13. The first horizontal edge 121 of the second radiating portion 12 is parallel to the second horizontal edge 132 of the feeding portion 13.

An upper portion of the other end edge 105 of the first radiating portion 11 extends opposite to the one end edge 104 of the first radiating portion 11 and extends along a rectangular spiral path to form a rectangular spiral third radiating portion 14. Specifically, the upper portion of the other end edge 105 of the first radiating portion 11 extends horizontally and opposite to the one end edge 104 of the first radiating portion 11, then extends downward, next extends towards the other end edge 105 of the first radiating portion 11, later extends upward and finally extends horizontally and opposite to the one end edge 104 of the first radiating portion 11 to form the rectangular spiral third radiating portion 14. The third radiating portion 14 extends along a spiral path and extends from the other end edge 105 of the first radiating portion 11.

The third radiating portion 14 has a first extending portion 141 extended horizontally and opposite to the one end edge 104 of the first radiating portion 11 from the upper portion of the other end edge 105 of the first radiating portion 11, a second extending portion 142 extended downward from a free end of the first extending portion 141, a third extending portion 143 extended towards the other end edge 105 of the first radiating portion 11 from a bottom end of the second extending portion 142, a fourth extending portion 144 extended upward from a free end of the third extending portion 143, and a fifth extending portion 145 extended horizontally and opposite to the one end edge 104 of the first radiating portion 11 from a top end of the fourth extending portion 144. The upper portion of the other end edge 105 of the first radiating portion 11, the first extending portion 141, the second extending portion 142, the third extending portion 143, the fourth extending portion 144 and the fifth extending portion 145 are connected in sequence. The first extending portion 141, the third extending portion 143, the fourth extending portion 144 and the fifth extending portion 145 are rectangular. The first extending portion 141, the third extending portion 143, the fourth extending portion 144 and the fifth extending portion 145 are rectangular straps. The first extending portion 141, the third extending portion 143 and the fifth extending portion 145 are parallel. The first radiating portion 11 is parallel to the fourth extending portion 144.

The second extending portion 142, the third extending portion 143, the fourth extending portion 144 and the fifth extending portion 145 are spaced from the other end edge 105 of the first radiating portion 11. An inner edge 106 of the fourth extending portion 144 faces the other end edge 105 of the first radiating portion 11. The inner edge 106 of the fourth extending portion 144 approaches the other end edge 105 of the first radiating portion 11. The inner edge 106 of the fourth extending portion 144 is spaced from the other end edge 105 of the first radiating portion 11. The inner edge 106 of the fourth extending portion 144 is parallel to the other end edge 105 of the first radiating portion 11.

A top edge 107 of the fifth extending portion 145 faces a lower edge 108 of the first extending portion 141. The top edge 107 of the fifth extending portion 145 approaches the lower edge 108 of the first extending portion 141. The top edge 107 of the fifth extending portion 145 is spaced from the lower edge 108 of the first extending portion 141. The top edge 107 of the fifth extending portion 145 is parallel to the lower edge 108 of the first extending portion 141. A free end edge 109 of the fifth extending portion 145 faces a straight edge 147 of the second extending portion 142. The free end edge 109 of the fifth extending portion 145 approaches the straight edge 147 of the second extending portion 142. The straight edge 147 of the second extending portion 142 extends along a vertical direction. The free end edge 109 of the fifth extending portion 145 is spaced from the straight edge 147 of the second extending portion 142. The free end edge 109 of the fifth extending portion 145 is parallel to the straight edge 147 of the second extending portion 142.

A bottom edge 148 of the fifth extending portion 145 faces an upper edge 149 of the third extending portion 143. The bottom edge 148 of the fifth extending portion 145 approaches the upper edge 149 of the third extending portion 143. The bottom edge 148 of the fifth extending portion 145 is spaced from the upper edge 149 of the third extending portion 143. The bottom edge 148 of the fifth extending portion 145 is parallel to the upper edge 149 of the third extending portion 143. An outer edge 140 of the fourth extending portion 144 faces the straight edge 147 of the second extending portion 142. The outer edge 140 of the fourth extending portion 144 is spaced from the straight edge 147 of the second extending portion 142. The outer edge 140 of the fourth extending portion 144 is parallel to the straight edge 147 of the second extending portion 142.

The first radiating portion 11 and the feeding portion 13 are operated at frequencies which are ranged from 698 MHz to 960 MHz. The second radiating portion 12 approaches the feeding portion 13 to cause the coupling effect. Electromagnetic wave circuits of the second radiating portion 12 and the feeding portion 13 are mutually transmitted, or the electromagnetic wave circuits of the second radiating portion 12 and the feeding portion 13 are interacted with each other to oscillate to generate frequencies which are ranged from 3300 MHz to 3800 MHz. The third radiating portion 14 is operated at frequencies which are ranged from 1710 MHz to 2690 MHz.

The grounding element 2 is located at the other end of the surface 102 of the antenna structure 100. The grounding element 2 is mounted at the other end of the front surface 103 of the substrate 101 and approaches the radiator 1. The grounding element 2 has a first grounding portion 21, a second grounding portion 22 and a connecting portion 23. The connecting portion 23 has a connecting edge 231 facing towards the one end edge 104 of the first radiating portion 11 and extending along the vertical direction. The connecting edge 231 of the connecting portion 23 is spaced from the one end edge 104 of the first radiating portion 11. The connecting edge 231 of the connecting portion 23 is parallel to the one end edge 104 of the first radiating portion 11. An upper portion and a lower portion of the connecting edge 231 of the connecting portion 23 extend horizontally and towards the one end edge 104 of the first radiating portion 11 to form the first grounding portion 21 and the second grounding portion 22. The first grounding portion 21 is located above the second grounding portion 22. The first grounding portion 21 is spaced from the second grounding portion 22. The first grounding portion 21 is parallel to the second grounding portion 22. The grounding element 2 is mounted at the front surface 103 of the substrate 101 and approaches the radiator 1. The grounding element 2 surrounds the feeding portion 13 to form a parasitic effect between the grounding element 2 and the feeding portion 13.

The feeding portion 13 is located between the first grounding portion 21 and the second grounding portion 22. The feeding portion 13 is positioned among the first grounding portion 21, the second grounding portion 22 and the connecting portion 23. The second radiating portion 12 is positioned among the first radiating portion 11, the feeding portion 13 and one of the first grounding portion 21 and the second grounding portion 22. The feeding portion 13 is spaced from the first grounding portion 21 and the second grounding portion 22. The first grounding portion 21 is located above the feeding portion 13, and the second grounding portion 22 is located below the feeding portion 13, so the first grounding portion 21 and the second grounding portion 22 of the grounding element 2, and the feeding portion 13 of the radiator 1 form the parasitic effect to generate other resonance frequencies. The first grounding portion 21 is longer than the second grounding portion 22 along the horizontal direction. The first grounding portion 21 is parallel to the second grounding portion 22. The feeding end 131 of the feeding portion 13 faces towards a middle of the connecting edge 231 of the connecting portion 23. The feeding end 131 of the feeding portion 13 approaches the middle of the connecting edge 231 of the connecting portion 23. The feeding end 131 of the feeding portion 13 is spaced from the middle of the connecting edge 231 of the connecting portion 23.

Figure 2:
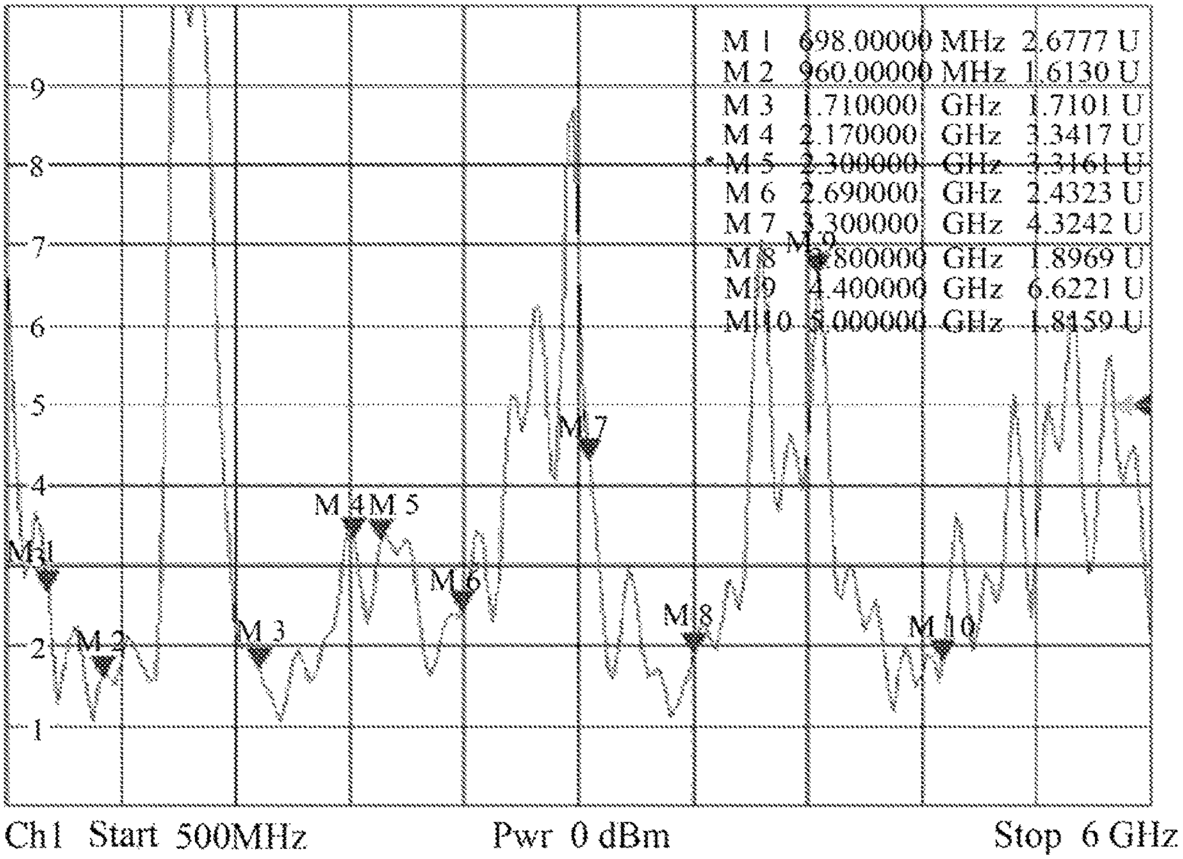
FIG. 2 is a voltage standing wave ratio test chart of the antenna structure in accordance with the preferred embodiment of the present invention.
Figure 3:
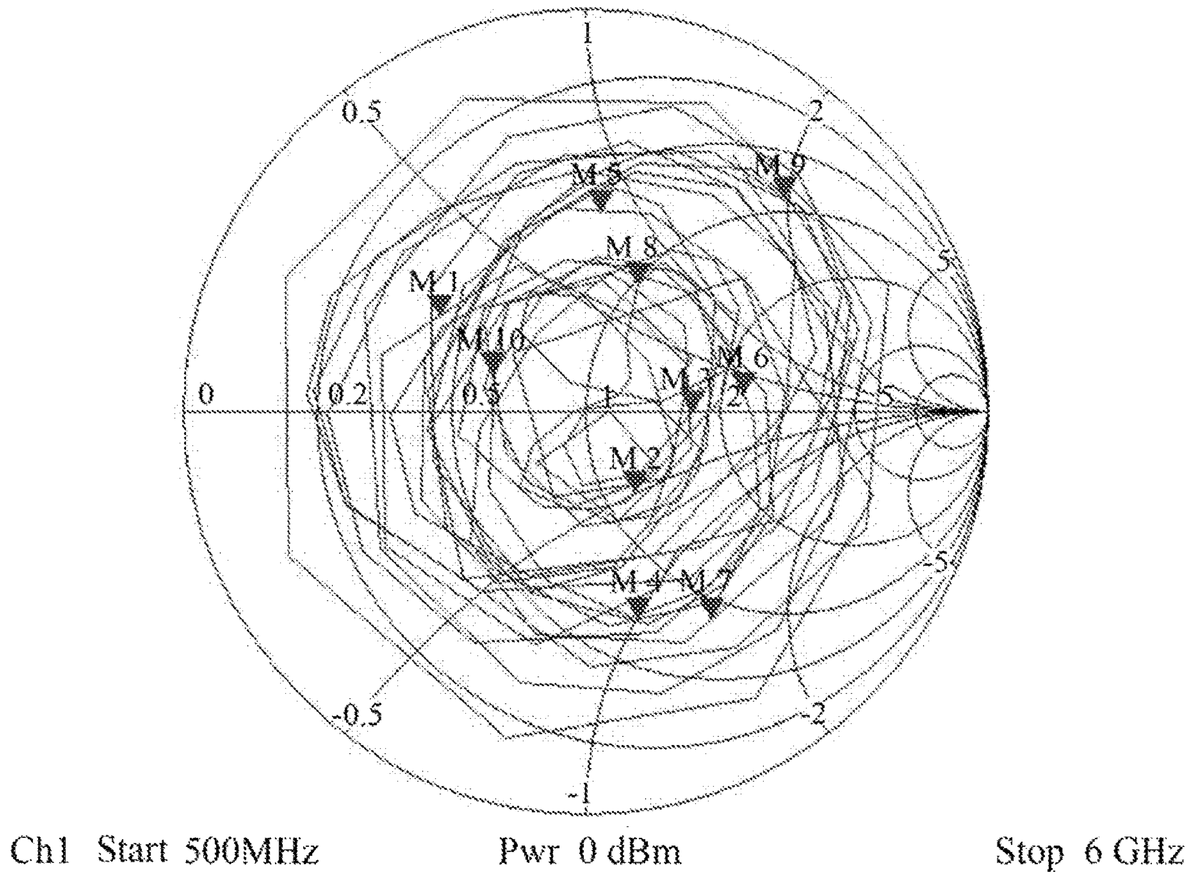
FIG. 3 is a Smith chart of the antenna structure in accordance with the preferred embodiment of the present invention.

With reference to FIG. 1 to FIG. 3, a voltage standing wave ratio (VSWR) test chart of the antenna structure 100 is shown in FIG. 2. A Smith chart of the antenna structure 100 is shown in FIG. 3. When the antenna structure 100 is operated at 698 MHz, a voltage standing wave ratio value of the antenna structure 100 is 2.6777 which is shown at a position M1 of FIG. 2. When the antenna structure 100 is operated at 960 MHz, the voltage standing wave ratio value of the antenna structure 100 is 1.6130 which is shown at a position M2 of FIG. 2. When the antenna structure 100 is operated at 1710 MHz, the voltage standing wave ratio value of the antenna structure 100 is 1.7101 which is shown at a position M3 of FIG. 2. When the antenna structure 100 is operated at 2170 MHz, the voltage standing wave ratio value of the antenna structure 100 is 3.3417 which is shown at a position M4 of FIG. 2. When the antenna structure 100 is operated at 2300 MHz, the voltage standing wave ratio value of the antenna structure 100 is 3.3161 which is shown at a position M5 of FIG. 2. When the antenna structure 100 is operated at 2690 MHz, the voltage standing wave ratio value of the antenna structure 100 is 2.4323 which is shown at a position M6 of FIG. 2. When the antenna structure 100 is operated at 3300 MHz, the voltage standing wave ratio value of the antenna structure 100 is 4.3242 which is shown at a position M7 of FIG. 2. When the antenna structure 100 is operated at 3800 MHz, the voltage standing wave ratio value of the antenna structure 100 is 1.8969 which is shown at a position M8 of FIG. 2. When the antenna structure 100 is operated at 4400 MHz, the voltage standing wave ratio value of the antenna structure 100 is 6.6221 which is shown at a position M9 of FIG. 2. When the antenna structure 100 is operated at 5000 MHz, the voltage standing wave ratio value of the antenna structure 100 is 1.8159 which is shown at a position M10 of FIG. 2. Therefore, the antenna structure 100 is a multi-band antenna structure. The antenna structure 100 is able to be stably operated at the frequencies which are ranged from 698 MHz to 960 MHz, the frequencies which are ranged from 1710 MHz to 2170 MHz and the frequencies which are ranged from 3300 MHz to 3800 MHz.

Figure 4:
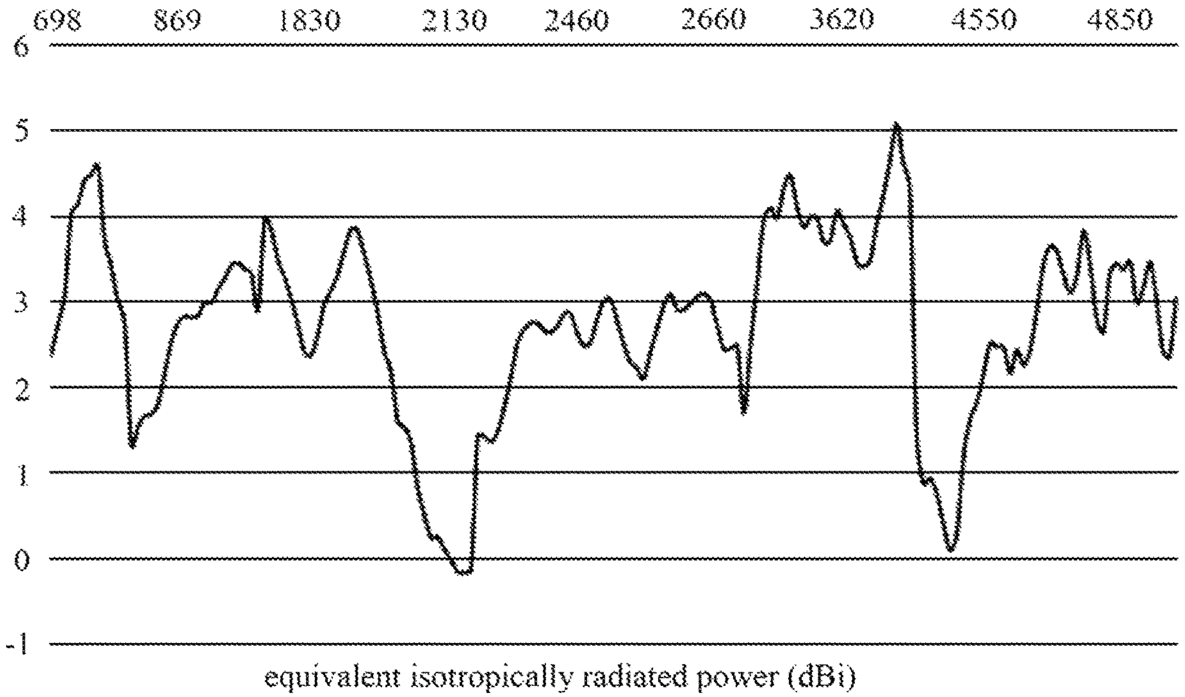
FIG. 4 is an equivalent isotropically radiated power chart of the antenna structure in accordance with the preferred embodiment of the present invention.

With reference to FIG. 1 and FIG. 4, an equivalent isotropically radiated power chart of the antenna structure 100 is shown in FIG. 4. A maximum value of radiated power of the antenna structure 100 which is operated at each frequency is shown in FIG. 4. In this preferred embodiment, peak values of the equivalent isotropically radiated power of the antenna structure 100 in a full frequency band fall within the same range, that is to say, the radiated power of the antenna structure 100 is stable. The first grounding portion 21 and the second grounding portion 22 of the grounding element 2, and the feeding portion 13 of the radiator 1 form the parasitic effect so as to generate other frequency bands at which the antenna structure 100 is operated. The frequency bands generated by the parasitic effect of the first grounding portion 21 and the second grounding portion 22 of the grounding element 2, and the feeding portion 13 of the radiator 1 include the resonance frequencies generated by the parasitic effect of the first grounding portion 21, the second grounding portion 22 and the feeding portion 13.

Referring to FIG. 1 and FIG. 7, a table showing average values of radiation efficiencies corresponding to frequency bands of the antenna structure 100 is shown in FIG. 7. When the antenna structure 100 is operated at a frequency band of 700 MHz, the antenna structure 100 is operated at the frequencies which are ranged from 704 MHz to 824 MHz, an average value of a radiation efficiency of the antenna structure 100 is 76.58%. When the antenna structure 100 is operated at a frequency band of 800 MHz, the antenna structure 100 is operated at the frequencies which are ranged from 791 MHz to 894 MHz, the average value of the radiation efficiency of the antenna structure 100 is 63.18%. When the antenna structure 100 is operated at a frequency band of 900 MHz, the antenna structure 100 is operated at the frequencies which are ranged from 880 MHz to 960 MHz, the average value of the radiation efficiency of the antenna structure 100 is 59.94%. When the antenna structure 100 is operated at a frequency band of 1800 MHz, the antenna structure 100 is operated at the frequencies which are ranged from 1710 MHz to 1890 MHz, the average value of the radiation efficiency of the antenna structure 100 is 67.09%. When the antenna structure 100 is operated at a frequency band of 1900 MHz, the antenna structure 100 is operated at the frequencies which are ranged from 1845 MHz to 1995 MHz, the average value of the radiation efficiency of the antenna structure 100 is 72.38%. When the antenna structure 100 is operated at a frequency band of 2100 MHz, the antenna structure 100 is operated at the frequencies which are ranged from 1920 MHz to 2170 MHz, the average value of the radiation efficiency of the antenna structure 100 is 56.19%. When the antenna structure 100 is operated at a frequency band of 2300 MHz, the antenna structure 100 is operated at the frequencies which are ranged from 2300 MHz to 2360 MHz, the average value of the radiation efficiency of the antenna structure 100 is 42.03%. When the antenna structure 100 is operated at a frequency band of 2600 MHz, the antenna structure 100 is operated at the frequencies which are ranged from 2500 MHz to 2690 MHz, the average value of the radiation efficiency of the antenna structure 100 is 54.43%. When the antenna structure 100 is operated at a frequency band of 3500 MHz, the antenna structure 100 is operated at the frequencies which are ranged from 3300 MHz to 3800 MHz, the average value of the radiation efficiency of the antenna structure 100 is 60.7%. When the antenna structure 100 is operated at a frequency band of 4500 MHz, the antenna structure 100 is operated at the frequencies which are ranged from 4400 MHz to 5000 MHz, the average value of the radiation efficiency of the antenna structure 100 is 52.95%.

Figure 5:
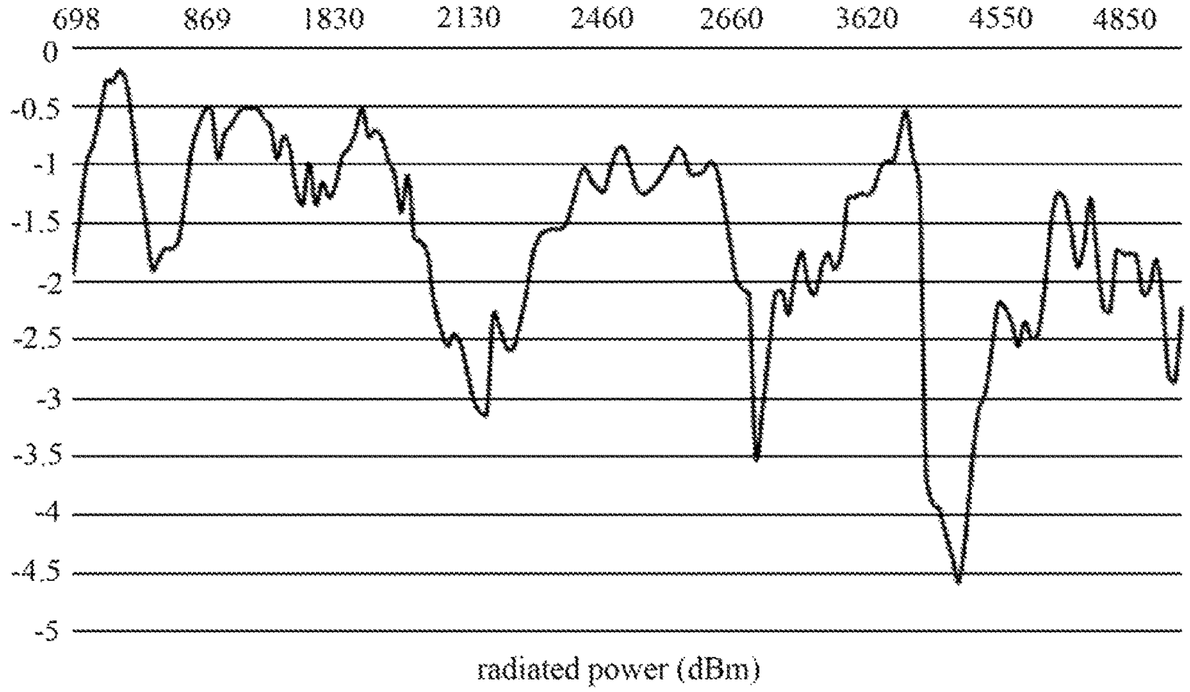
FIG. 5 is a radiated power chart of the antenna structure in accordance with the preferred embodiment of the present invention.
Figure 6:
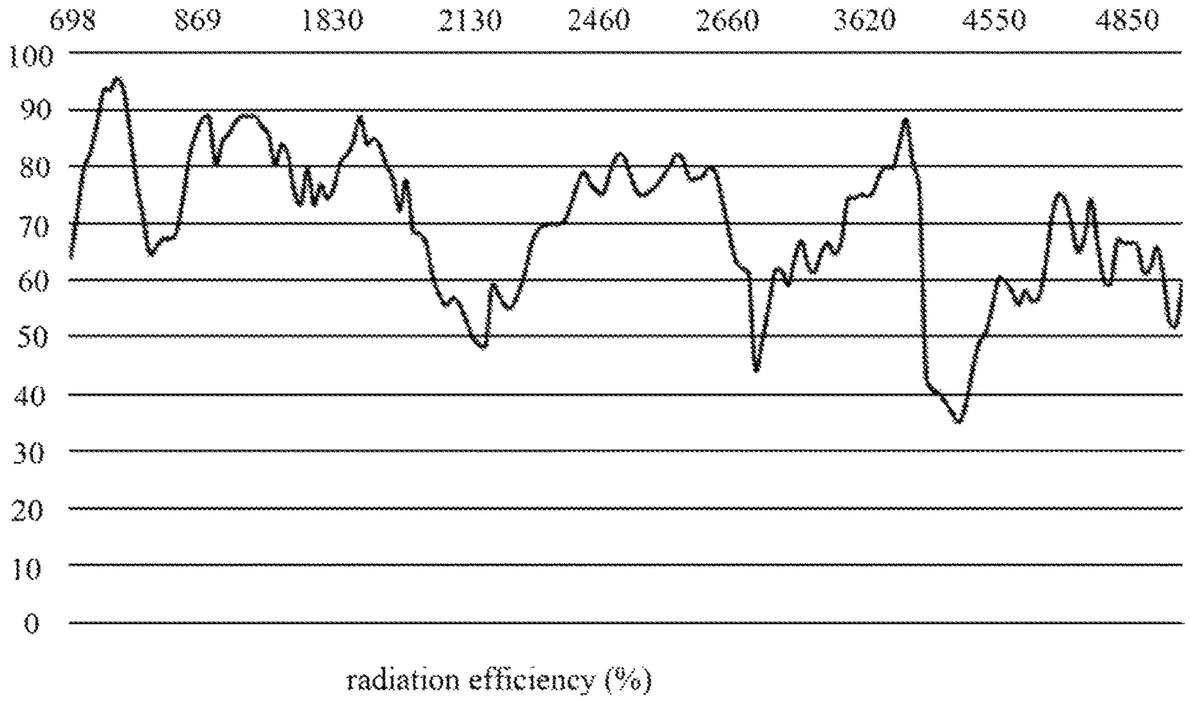
FIG. 6 is a radiation efficiency chart of the antenna structure in accordance with the preferred embodiment of the present invention.

With reference to FIG. 1 to FIG. 7, a radiated power chart of the antenna structure 100 is shown in FIG. 5, and a radiation efficiency chart of the antenna structure 100 is shown in FIG. 6. The radiated power of the antenna structure 100 is able to be converted to the radiation efficiency of the antenna structure 100. Average power of the antenna structure 100 and the average values of the radiation efficiencies of the antenna structure 100 are able to proceed with a conversion. The average power of the antenna structure 100 is converted into the average values of the radiation efficiencies of the antenna structure 100. When the antenna structure 100 is operated at the different frequencies, the higher a value of the radiation efficiency of the antenna structure 100 is, the better the antenna structure 100 is. In this preferred embodiment, the average values of the radiation efficiencies which are corresponding to lower frequency bands are above 50%. Therefore, the antenna structure 100 is able to achieve higher values of the radiation efficiencies which are corresponding to the lower frequency bands in a limited space, and the antenna structure 100 is able to maintain higher frequency bands, and the radiation efficiencies which are corresponding to the higher frequency bands in the limited space.

As described above, the antenna structure 100 is the dipole antenna structure, the radiator 1 is operated at the frequencies which are ranged from 698 MHz to 960 MHz, the frequencies which are ranged from 1710 MHz to 2170 MHz and the frequencies which are ranged from 3300 MHz to 3800 MHz. The antenna structure 100 is operated at the frequency bands which are generated by the parasitic effect of the first grounding portion 21 and the second grounding portion 22 of the grounding element 2, and the feeding portion 13 of the radiator 1. In that case, the antenna structure 100 is with the multiple frequency bands, the antenna structure 100 is capable of having a multiple frequency band function in the limited space, so application frequency bands of the antenna structure 100 are wider, and an area of the antenna structure 100 is able to be used more effectively to save a space.

What is claimed is:

1. An antenna structure, comprising:

a substrate;

a radiator mounted at one end of a front surface of the substrate, the radiator having a first radiating portion, two portions of a middle of one end edge of the first radiating portion extending horizontally to form a second radiating portion and a feeding portion, the feeding portion being located above the second radiating portion, a free end of the feeding portion being a feeding end, an upper portion of the other end edge of the first radiating portion extending opposite to the one end edge of the first radiating portion and extending along a rectangular spiral path to form a rectangular spiral third radiating portion; and a grounding element mounted at the other end of the front surface of the substrate, the grounding element having a first grounding portion, a second grounding portion and a connecting portion, the connecting portion having a connecting edge facing towards the one end edge of the first radiating portion and extending along a vertical direction, the connecting edge being spaced from the one end edge of the first radiating portion, an upper portion and a lower portion of the connecting edge extending horizontally and towards the one end edge of the first radiating portion to form the first grounding portion and the second grounding portion, the first grounding portion being located above the feeding portion, and the second grounding portion being located below the feeding portion.

2. The antenna structure as claimed in claim 1, wherein the upper portion of the other end edge of the first radiating portion extends horizontally and opposite to the one end edge of the first radiating portion, then extends downward, next extends towards the other end edge of the first radiating portion, later extends upward and finally extends horizontally and opposite to the one end edge of the first radiating portion to form the rectangular spiral third radiating portion.

3. The antenna structure as claimed in claim 1, wherein the third radiating portion has a first extending portion extended horizontally and opposite to the one end edge of the first radiating portion from the upper portion of the other end edge of the first radiating portion, a second extending portion extended downward from a free end of the first extending portion, a third extending portion extended towards the other end edge of the first radiating portion from a bottom end of the second extending portion, a fourth extending portion extended upward from a free end of the third extending portion, and a fifth extending portion extended horizontally and opposite to the one end edge of the first radiating portion from a top end of the fourth extending portion.

4. The antenna structure as claimed in claim 3, wherein the upper portion of the other end edge of the first radiating portion, the first extending portion, the second extending portion, the third extending portion, the fourth extending portion and the fifth extending portion are connected in sequence.

5. The antenna structure as claimed in claim 3, wherein the first extending portion, the third extending portion, the fourth extending portion and the fifth extending portion are rectangular straps, the first extending portion, the third extending portion and the fifth extending portion are parallel, the first radiating portion is parallel to the fourth extending portion.

6. The antenna structure as claimed in claim 3, wherein the second extending portion, the third extending portion, the fourth extending portion and the fifth extending portion are spaced from the other end edge of the first radiating portion, an inner edge of the fourth extending portion faces the other end edge of the first radiating portion, the inner edge of the fourth extending portion approaches the other end edge of the first radiating portion, the inner edge of the fourth extending portion is spaced from the other end edge of the first radiating portion, the inner edge of the fourth extending portion is parallel to the other end edge of the first radiating portion.

7. The antenna structure as claimed in claim 3, wherein a top edge of the fifth extending portion faces a lower edge of the first extending portion, the top edge of the fifth extending portion approaches the lower edge of the first extending portion, the top edge of the fifth extending portion is spaced from the lower edge of the first extending portion, the top edge of the fifth extending portion is parallel to the lower edge of the first extending portion, a free end edge of the fifth extending portion faces a straight edge of the second extending portion, the straight edge of the second extending portion extends along the vertical direction, the free end edge of the fifth extending portion approaches the straight edge of the second extending portion, the free end edge of the fifth extending portion is spaced from the straight edge of the second extending portion, the free end edge of the fifth extending portion is parallel to the straight edge of the second extending portion.

8. The antenna structure as claimed in claim 3, wherein a bottom edge of the fifth extending portion faces an upper edge of the third extending portion, the bottom edge of the fifth extending portion approaches the upper edge of the third extending portion, the bottom edge of the fifth extending portion is spaced from the upper edge of the third extending portion, the bottom edge of the fifth extending portion is parallel to the upper edge of the third extending portion, an outer edge of the fourth extending portion faces a straight edge of the second extending portion, the straight edge of the second extending portion extends along the vertical direction, the outer edge of the fourth extending portion is spaced from the straight edge of the second extending portion, the outer edge of the fourth extending portion is parallel to the straight edge of the second extending portion.

9. The antenna structure as claimed in claim 1, wherein the first radiating portion and the feeding portion are operated at frequencies which are ranged from 698 MHz to 960 MHz, the second radiating portion approaches the feeding portion to cause a coupling effect, electromagnetic wave circuits of the second radiating portion and the feeding portion are interacted with each other to oscillate to generate frequencies which are ranged from 3300 MHz to 3800 MHz, the third radiating portion is operated at frequencies which are ranged from 1710 MHz to 2690 MHz.

10. The antenna structure as claimed in claim 1, wherein the feeding portion is longer than the second radiating portion along a horizontal direction.

11. The antenna structure as claimed in claim 1, wherein the second radiating portion and the feeding portion are rectangular strips, a first horizontal edge of the second radiating portion faces a second horizontal edge of the feeding portion, the first horizontal edge of the second radiating portion approaches the second horizontal edge of the feeding portion, the first horizontal edge of the second radiating portion is spaced from the second horizontal edge of the feeding portion, the first horizontal edge of the second radiating portion is parallel to the second horizontal edge of the feeding portion.

12. The antenna structure as claimed in claim 1, wherein the first radiating portion is rectangular.

13. The antenna structure as claimed in claim 1, wherein the first grounding portion is longer than the second grounding portion along a horizontal direction, the first grounding portion is parallel to the second grounding portion, the feeding end of the feeding portion faces towards a middle of the connecting edge of the connecting portion, the feeding end of the feeding portion approaches the middle of the connecting edge of the connecting portion, the feeding end of the feeding portion is spaced from the middle of the connecting edge of the connecting portion.

14. The antenna structure as claimed in claim 1, wherein the connecting edge of the connecting portion is parallel to the one end edge of the first radiating portion, the first grounding portion is spaced from the second grounding portion, the first grounding portion is located above the second grounding portion, the first grounding portion is parallel to the second grounding portion, the feeding portion is located between the first grounding portion and the second grounding portion, the feeding portion is spaced from the first grounding portion and the second grounding portion, the first grounding portion and the second grounding portion of the grounding element, and the feeding portion of the radiator form a parasitic effect.

15. An antenna structure, comprising:

a substrate;

a radiator mounted at one end of a front surface of the substrate, the radiator having a first radiating portion, two portions of a middle of one end edge of the first radiating portion extending horizontally to form a second radiating portion, and a feeding portion approaching the second radiating portion, a free end of the feeding portion being a feeding end, the other end edge of the first radiating portion extending horizontally and opposite to the one end edge of the first radiating portion, then extending downward, next extending towards the other end edge of the first radiating portion, later extending upward and finally extending horizontally and opposite to the one end edge of the first radiating portion to form a rectangular spiral third radiating portion; and a grounding element mounted at the other end of the front surface of the substrate and approaching the radiator, the grounding element having a first grounding portion, a second grounding portion and a connecting portion, the connecting portion having a connecting edge facing towards the one end edge of the first radiating portion, the connecting edge being spaced from the one end edge of the first radiating portion, an upper portion and a lower portion of the connecting edge extending horizontally and towards the one end edge of the first radiating portion to form the first grounding portion and the second grounding portion, the feeding portion being positioned among the first grounding portion, the second grounding portion and the connecting portion, the second radiating portion being positioned among the first radiating portion, the feeding portion and one of the first grounding portion and the second grounding portion, the feeding end of the feeding portion approaching the middle of the connecting edge of the connecting portion, the feeding end of the feeding portion being spaced from the middle of the connecting edge of the connecting portion, the first grounding portion and the second grounding portion of the grounding element.

16. An antenna structure, comprising:

a substrate;

a radiator mounted at one end of a front surface of the substrate, the radiator having:

a first radiating portion having one end edge, and the other end edge opposite to the one end edge;

a feeding portion horizontally extending from a middle of the one end edge of the first radiating portion, a free end of the feeding portion being a feeding end;

a second radiating portion horizontally extending from the middle of the one end edge of the first radiating portion, the second radiating portion approaching the feeding portion to cause a coupling effect between the feeding portion and the second radiating portion; and a third radiating portion extending along a spiral path and extending from the other end edge of the first radiating portion; and a grounding element mounted at the front surface of the substrate and approaching the radiator, the grounding element surrounding the feeding portion to form a parasitic effect between the grounding element and the feeding portion.

* * * * *